Jan. 9, 1968   E. P. AGHNIDES   3,362,648
FLEXIBLE WATER AERATOR
Original Filed Dec. 17, 1964
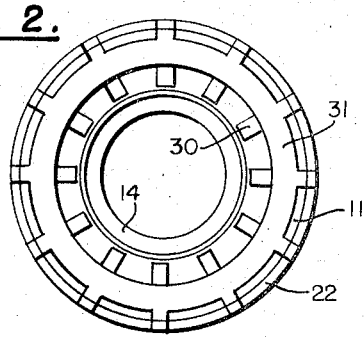
FIG. 2.
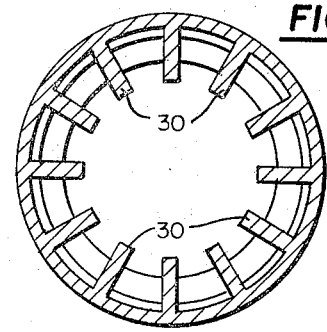
FIG. 4.
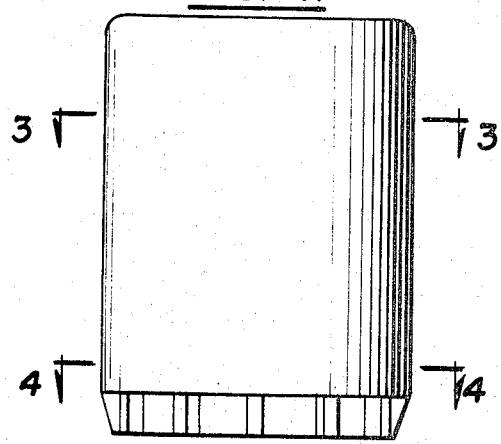
FIG. 1.
FIG. 3.
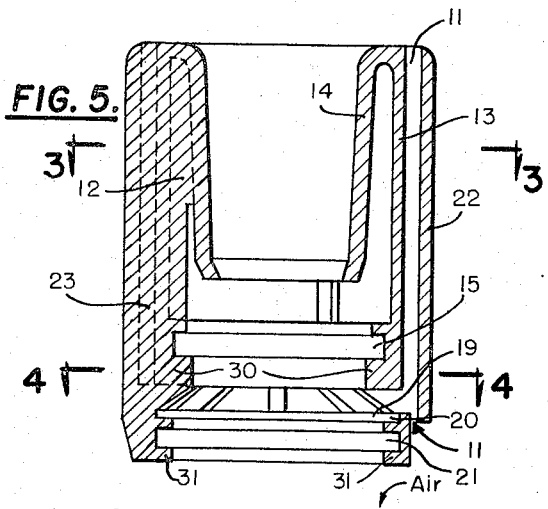
FIG. 5.
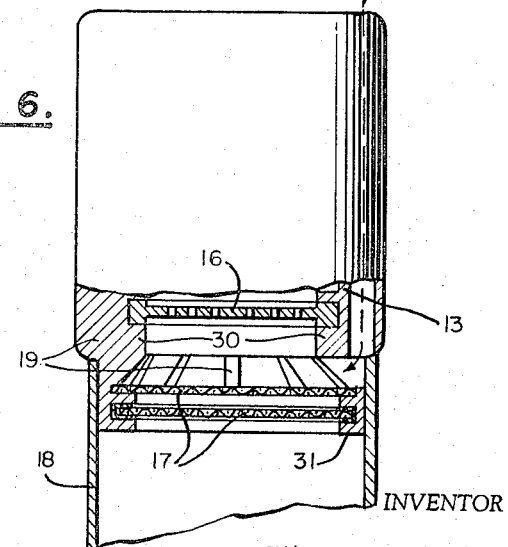
FIG. 6.
INVENTOR
Elie P. Aghnides
BY
Hall, Pollock, & VandeSande
ATTORNEYS

United States Patent Office 3,362,648
Patented Jan. 9, 1968

3,362,648
FLEXIBLE WATER AERATOR
Elie P. Aghnides, 46 W. 54th St., New York, N.Y. 10019
Continuation of application Ser. No. 419,088, Dec. 17, 1964. This application Oct. 19, 1966, Ser. No. 587,935
8 Claims. (Cl. 239—428.5)

This is a continuation of application Ser. No. 419,088, filed Dec. 17, 1964.

This invention relates to elastic faucet aerators. Elastic faucet aerators are especially adapted for use on faucets that has no threads, for example on oval faucets or old style unthreaded faucets.

The main object of this invention is to provide an improved elastic aerator, made in rubbers, elastic plastics or the like.

Another object of this invention is to provide an elastic aerator having greater water output capabilities than has heretofore been possible, all without loss of structural strength, faucet gripping force, etc.

Another object of the invention is to provide an elastic aerator that is more sanitary than has heretofore been possible.

Still another object of the invention is to provide an elastic aerator which may be molded in one piece.

Other objects and advantages will appear as this description proceeds.

The invention in one form embodies three coaxial cylindrical elastic tubes of successively larger diameters and with each longer than the one inside of it. The two innermost cylindrical tubes are connected together at their top ends, and the space between the two outermost cylindrical tubes forms an air passageway. There is a perforated plastic disc carried at the downstream end of the middle cylinder. The two outermost cylinders are connected together by webs and at the lower end of one or more of these cylinders there is a socket that receives one or more mixing screens.

A flexible hose or tube may be added to the lower end of the aerator to direct the aerated water to any part of the sink or basin.

In the drawings:

FIGURE 1 is a front elevation showing the outside appearance of the new aerator.

FIGURE 2 is a bottom view of the aerator of FIGURE 1 with the screens and diaphragm omitted.

FIGURE 3 is a cross sectional view taken along lines 3—3 of FIGURES 1 and 5.

FIGURE 4 is a cross-sectional view taken along the lines 4—4 of FIGURES 1 and 5.

FIGURE 5 is a cross sectional view taken along the lines 5—5 of FIGURE 3.

FIGURE 6 is a front elevation view of the aerator with the lower portion broken away and shown in section, and wherein a flexible tube is added and shown in section.

The aerator comprises a one-piece casing of rubber or other elastomeric material shown in FIGURES 1 through 5, inclusive, it being understood that all of the parts shown in these five figures are molded integrally to form a unitary structure. This unitary one-piece structure includes an inner cylindrical portion 14 adapted to be inserted on the spout end of a faucet, and it connects at its upper end to the cylindrical member 13 which extends downwardly and has a socket 15 for receiving a perforated disc 16 (FIGURE 6). The cylindrical member 14 is attached to the cylindrical member 13 by three webs 12 (see FIGURES 3 and 5). Integrally with the lower end of cylindrical member 13 is a cylindrical member 19 which has recess 20 and socket 21 for receiving screens 17 (FIGURE 6), and supporting them in the path of the water from the disc 16. An outer cylindrical member 22 is fastened by means of twelve webs 23 (see FIGURES 3 and 5) to the cylindrical member 13, leaving twelve vertical air passageways 11 running from the extreme top to near the bottom of the aerator. These passageways 11 allow air to enter either from the bottom of the aerator or from the extreme top of the aerator and pass to the mixing space which is located between disc 16 and screens 17.

In event that it is desired to direct the water on to any portion of the sink or basin in which the faucet is installed, a rubber tube or hose 18 may be slipped on to the lower end of the aerator, as shown at FIGURE 6, and it will receive the aerated water. If this rubber tube or hose is, for example, on the order of two or three inches long, and is of flexible material, the water may be directed on to any part of the sink merely by pointing the open end of the tube 18 in the appropriate direction.

Recess 20 and/or socket 21 may be made integral with hose 18 to carry therein screens 17, if desired.

The tube 18 need not extend as far upward on the body of the aerator as is shown, and if a small space is allowed to exist between the upper end of tube 18 and the aerator body, air can enter this small space as well as enter at the extreme top of the aerator.

One of the two screens 17 should have a frame in order to resist crushing of the screens while the aerator is being gripped by the hand. For example, it is often firmly gripped when the aerator is being inserted on a faucet. A suitable frame for one or more of the screens 17 is shown at 22 in my prior U.S. Patent 2,950,062, granted Aug. 23, 1960, and entitled, Screen Framing Structures for Fluid Mixing Devices.

The perforated disc 16 may be made of plastic, preferably a plastic that is resistant to calcium deposits.

In operation, the water entering the aerator is divided into a plurality of high velocity jets by disc 16. These high velocity jets impinge on screens 17 and are broken up in the presence of air in the mixing space 16–17 and are discharged from the lower end of the aerator as a single coherent whitish jet containing numerous small bubbles.

The aerator of FIGURES 1 to 5 may be as small as 30 millimeters in diameter and 40 millimeters in length. It will fit most faucets now on the market or in use in this country, including faucets of both round and oval cross section. Yet it will discharge a jet of aerated water 20 millimeters in diameter which is larger than any aerated stream discharged by elastic aerators of the prior art.

In an elastic aerator there are a number of factors involved in the design. The aerator must be large enough to apply adequate gripping pressure to the faucet, it must have structural strength, and it must protect the internal parts from damage. These factors heretofore have required a heavy and thick wall construction which has greatly decreased the quantity of aerated water that may be discharged from the aerator. In constrast, the arrangement of parts comprising the present invention not only provides the necessary gripping force, the necessary structural strength, and the necessary protection of internal parts, but to a large degree overcomes the problem of limited water output. In addition, it provides a more sanitary rubber aerator than has heretofore been possible.

I claim:

1. An aerator comprising a unitary body of elastomeric material, said body comprising three substantially cylindrical coaxial members in which the middle member is longer than the inner one, the inner and middle members being connected together at least at their upper ends, means connecting said outer member to said middle member, diaphragm means supported by the middle member downstream of the downstream end of the inner member for forming a plurality of high velocity streamlets, said body including a socket carried below said diaphragm by at least one of the two outermost members, mixing means carried by said socket for finely breaking up the water from said diaphragm and mixing it with air to produce a coherent jet laden with numerous small bubbles, said diaphragm and said mixing means being spaced apart to form a mixing space, said body including an air passageway extending laterally from the mixing space to the inner wall of the outer cylindrical member, said outer cylindrical member surrounding said air passageway and defining a second air passageway that is generally parallel to the axis of the cylindrical members for feeding air from at least one end of the outer cylindrical members to the first-named air passageway.

2. The aerator of claim 1 in which said connecting means comprises a plurality of longitudinal webs extending radially between said middle and outer members.

3. An aerator as defined in claim 2 in which said middle and outer cylindrical members define between said webs said air passageway which extends from the mixing space toward the upstream end of the aerator.

4. An aerator as defined in claim 2 in which the lower end of the aerator body includes a friction surface, and the aerator further includes a flexible tube adapted at one end to fit on said friction surface so that the aerated water may be directed by said flexible tube at various angles.

5. An aerator as defined in claim 2 in which said middle and outer cylindrical members define between said webs said air passageway which extends from the mixing space toward the downstream end of the aerator.

6. An aerator as defined in claim 1 in which additional radially extending longitudinal webs connect said inner member to said middle member.

7. An aerator as defined in claim 1 in which said middle cylindrical means defines socket means for holding said diaphragm means, said socket means including a series of inwardly extending arms engaging the downstream side of the diaphragm means.

8. An aerator as defined in claim 1 in which said second air passageway feeds air to said mixing space from the upstream end of said outer member.

References Cited
UNITED STATES PATENTS

| | | | |
|---|---|---|---|
| 2,244,280 | 6/1941 | Aghnides | 239—428.5 |
| 2,664,278 | 12/1953 | Aghnides | 239—428.5 |
| 2,816,746 | 12/1957 | Botnich | 239—428.5 |

EVERETT W. KIRBY, *Primary Examiner.*